J. CHRISTY.
MEANS FOR OPERATING STEAMBOAT CHIMNEYS.
No. 9,889. Reissued Oct. 11, 1881.
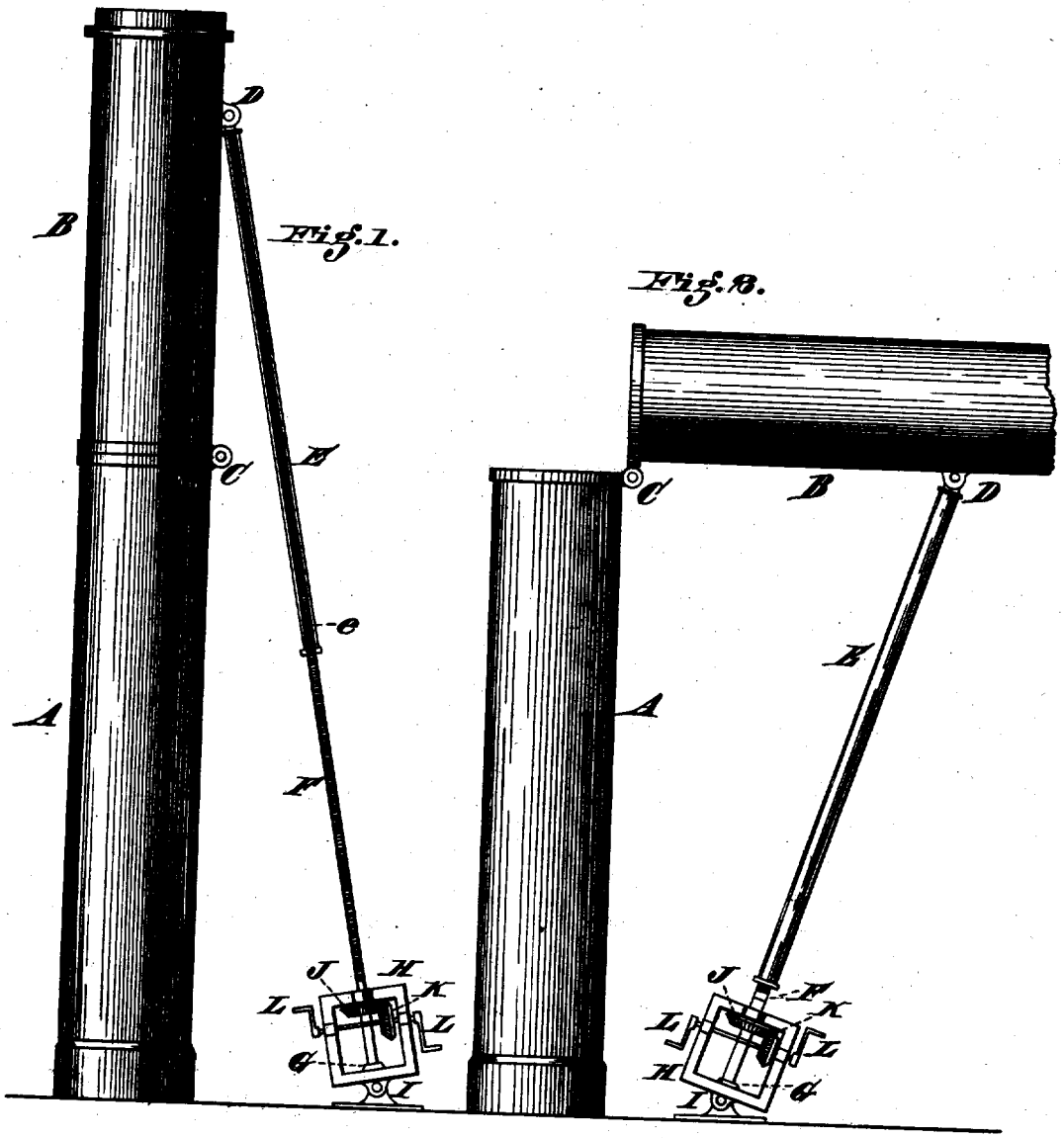
Attest
Jno. L. Jones
Eugene L. Grundner
Inventor
John Christy,
by Wood & Boyd,
his Attorneys, &c.
N. PETERS, Photo-Lithographer, Washington, D. C.

UNITED STATES PATENT OFFICE.

JOHN CHRISTY, OF CINCINNATI, OHIO.

MEANS FOR OPERATING STEAMBOAT-CHIMNEYS.

SPECIFICATION forming part of Reissued Letters Patent No. 9,889, dated October 11, 1881.

Original No. 136,414, dated March 4, 1873. Application for reissue filed September 1, 1881.

*To all whom it may concern:*

Be it known that I, JOHN CHRISTY, of Cincinnati, Hamilton county, Ohio, have invented a new and useful Device for Lowering and Raising Steamboat-Chimneys, of which the following is a specification.

The object of this invention is to provide simple and efficient means for raising and lowering the hinged or movable section of a steamboat-chimney; and to this end my invention consists, essentially, in the combination, with the movable section of the chimney, of an extension-rod, one end of which is hinged or pivoted to the movable chimney-section and the other end having a pivoted or swiveled connection with the deck of the vessel, all in such manner that when the extension-rod is retracted the movable chimney-section will be lowered, and when the rod is extended the said chimney-section will be raised, the arrangement being such that substantially the entire weight of the hinged chimney-section is sustained by the deck of the vessel, and thereby the stationary part of the chimney is relieved from excessive strain, which results are not attained when the devices for raising and lowering the movable chimney-section are sustained or supported by their attachment to the stationary part of the chimney.

Figure 1 is an elevation of a steamboat-chimney provided with my apparatus, the hinged member being in its normal or elevated position, and the screw-threaded tube of the apparatus shown in section. Fig. 2 is an elevation, showing the position the various parts assume when the hinged section is lowered.

A represents the lower or principal portion of the chimney; B, the upper or movable portion, secured by the customary hinge C to the said portion A. The movable section B has a lug, D, to which is hinged or pivoted the upper end of a tube, E, which may be composed of a piece of gas-pipe. The lower end of the tube E contains a nut or screw-threaded throat, *e*, to receive a screw, F, whose lower end is journaled in a step, G, in the lower part of a rocking frame, H, secured to the deck or other stationary object by means of a hinge, I. The screw F has attached to it a bevel-wheel, J, in which gears another bevel-wheel, K, which is journaled in the rocking frame H, and is provided with one or more cranks or handles, L, by which the device is operated.

From the above-described preferred form of my improvement I may vary in non-essential particulars. For example, a capstan may replace the bevel-wheel K.

I claim—

1. The combination, with the movable section of a steamboat-chimney, of an extension-rod one end of which is hinged or pivoted to the movable chimney-section and the other end of which is supported by a pivoted or swiveled connection with the deck.

2. The combination of screw-threaded tube E, hinged or pivoted to the movable chimney-section B, and containing a screw, F, secured in a rocking frame, H, attached to the deck or other stationary object upon the boat or vessel.

In testimony of which invention I hereunto set my hand.

JOHN CHRISTY.

Witnesses:
E. E. WOOD,
JNO. E. WILES.